United States Patent [19]
Biacchi

[11] Patent Number: 4,938,394
[45] Date of Patent: Jul. 3, 1990

[54] CONTAINER FOR DISPENSING MEASURED QUANTITIES OF FREE FLOWING POWDERED MATERIAL

[76] Inventor: Joseph A. Biacchi, 102 Prospect St., Jamestown, N.Y. 14701

[21] Appl. No.: 418,957

[22] Filed: Oct. 10, 1989

Related U.S. Application Data

[63] Continuation of Ser. No. 291,285, Dec. 28, 1988, abandoned.

[51] Int. Cl.$^5$ .............................................. G01F 11/26
[52] U.S. Cl. ................................... 222/456; 222/564
[58] Field of Search ............................... 222/454–457, 222/564, 547, 584; 221/288

[56] References Cited

U.S. PATENT DOCUMENTS

| | | | |
|---|---|---|---|
| 1,155,323 | 9/1915 | McBroom | 222/456 |
| 1,498,491 | 6/1924 | Stinson et al. | 222/456 |
| 2,022,031 | 11/1935 | Fisher | 222/456 |
| 2,309,234 | 1/1943 | Bonander | 222/456 |
| 2,665,036 | 1/1954 | Riva | 222/456 X |
| 2,803,385 | 8/1957 | Silver et al. | 222/456 |
| 2,896,826 | 7/1959 | Matter | 222/455 |
| 3,235,144 | 2/1966 | Pitkin et al. | 222/455 |
| 3,298,576 | 1/1967 | Sellors | 222/456 |
| 3,738,544 | 6/1973 | Brown | 222/457 X |
| 4,667,857 | 5/1987 | Song | 222/457 X |

FOREIGN PATENT DOCUMENTS

| | | | |
|---|---|---|---|
| 33429 | 2/1908 | Fed. Rep. of Germany | 222/456 |
| 2120782 | 12/1971 | Fed. Rep. of Germany | 222/454 |
| 2356115 | 5/1974 | Fed. Rep. of Germany | 222/456 |
| 937128 | 8/1948 | France | 222/456 |
| 420717 | 12/1934 | United Kingdom | 222/456 |

Primary Examiner—Kevin P. Shaver
Attorney, Agent, or Firm—Ralph Hammar

[57] ABSTRACT

A container for dispensing measured quantities of free flowing material such as powders which is designed to be manufactured from a single blank of cardboard.

The operation of the container is controlled by two generally parallel baffles spaced from each other and at an acute angle to the bottom of the container. The first baffle defines the measuring chamber between its lower end and the bottom of the container. The second baffle overlays the first baffle and defines a passageway from which material can be conducted to the measuring chamber when the measuring chamber is to be loaded and from which excess material can be returned to the container when the material is dispensed.

6 Claims, 2 Drawing Sheets

CONTAINER FOR DISPENSING MEASURED QUANTITIES OF FREE FLOWING POWDERED MATERIAL

This is a continuation of U.S. application Ser. No. 291,285, filed Dec. 28, 1988, now abandoned.

This invention is a container for dispensing measured quantities of soap powders and other free flowing powdered or granular material.

Figure 1:
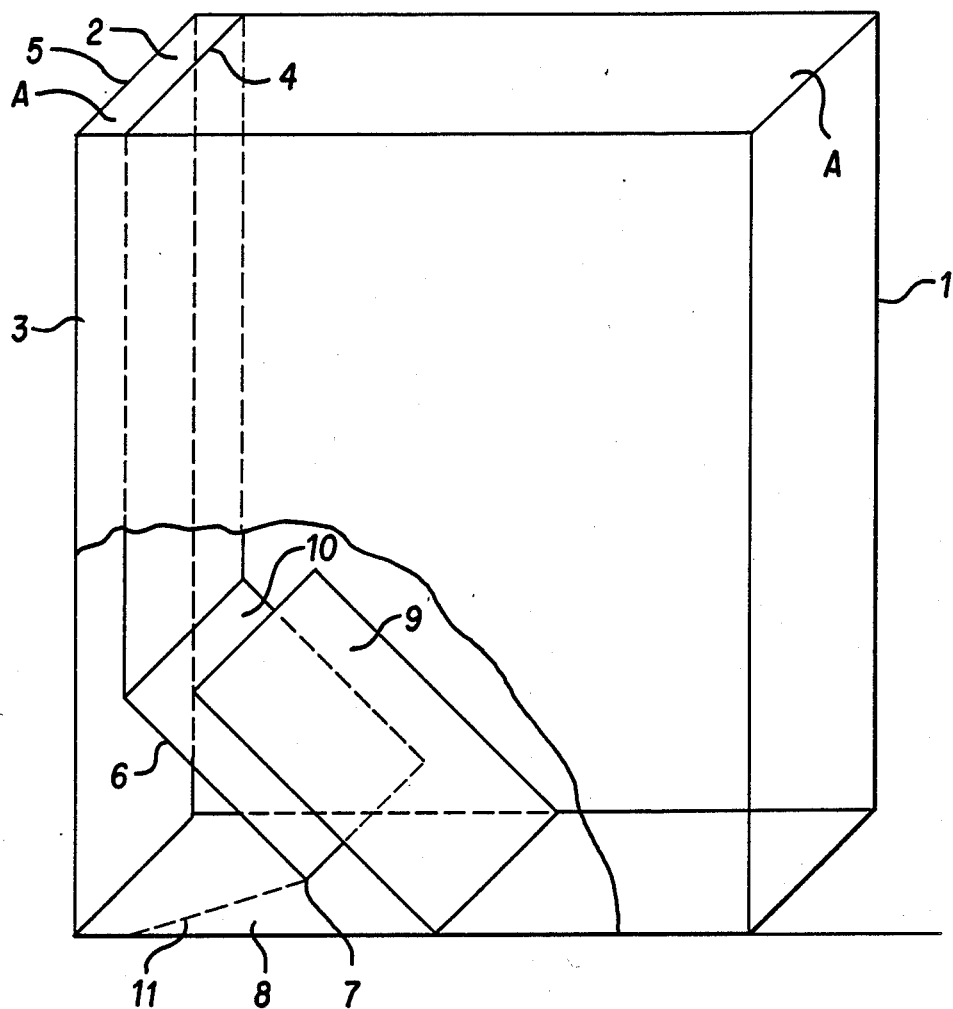
Figure 4:
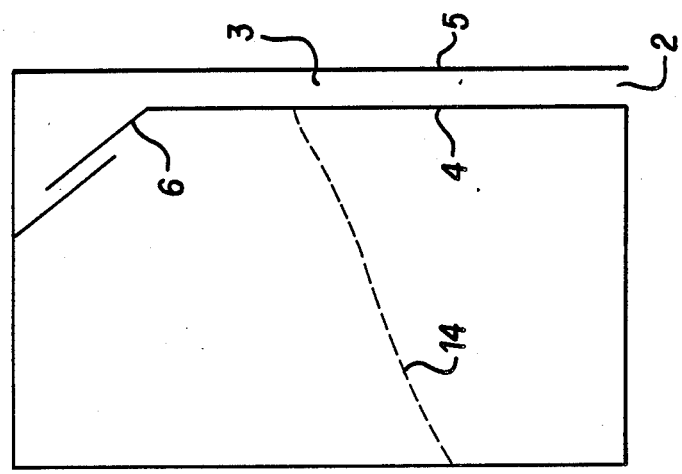
Figure 3:
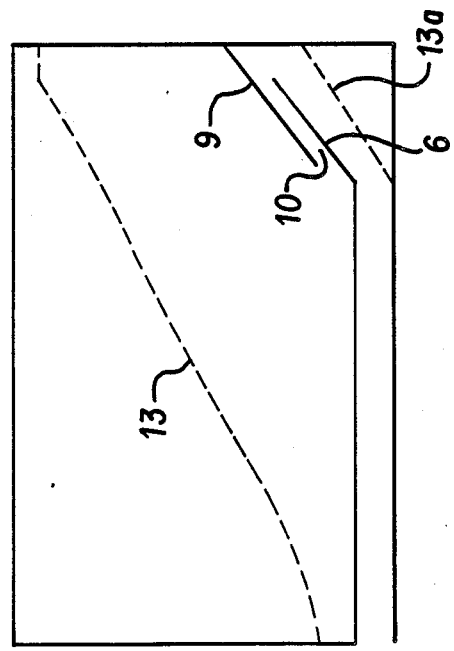
Figure 2:
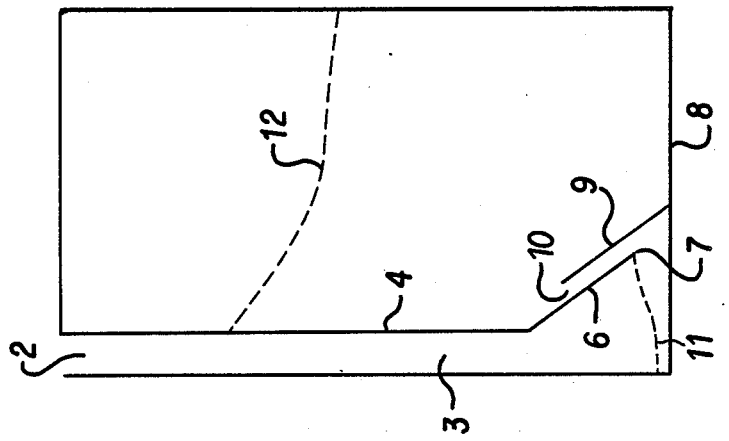

In the drawing, FIG. 1 is a perspective partly broken away of a box of soap powder in upright or normal storage position and FIGS. 2, 3, 4 are vertical sections on line A—A in successive positions from storage to dispensing.

The container 1 typically made from folded cardboard has a discharge nozzle or opening 2 at the top of the container which is sealed closed during shipment by a removable or hinged closure of common design, not shown. The discharge nozzle is at the top of a rectangular channel or duct 3 formed between an internal wall 4 and an end wall 5 of the container. At the lower end of the container, the wall 4 is bent inward at an acute angle to the bottom wall 8 to form a baffle 6 which terminates at 7 above the bottom wall 8 of the container. This provides a power receiving measuring chamber feeding the duct 3 and discharge nozzle 2. A baffle 9 generally parallel to the baffle 6 and extending at an acute angle from the bottom wall 8 up past the lower end 7 of the wall or baffle 6 provides an entrance 10 for soap powder from the main body of the container to the measuring chamber between the lower end 7 of the internal wall 4 and the bottom of the container. No matter how high the level of powder in the main body of the container, the amount of powder which can flow into the measuring chamber between the baffle 9 and the lower end 7 of the wall 4 is equal to the space between the baffle 9 and the lower end of the container and the powder below dotted line 11 which is determined by the angle of repose of the soap powder. In FIG. 2 the powder settles below dotted line 12. As the container is tilted from the position shown in FIG. 2 to the position shown in FIG. 3, the material drops below line 13. The material between the baffles 9 and 6 does not flow into the measuring chamber because the material indicated by dotted line 11 is separated from the material remaining between baffles 9 and 6 due to the angular position of the baffles. The material in the measuring chamber remains below dotted line 13a. When the container reaches the dispensing position shown in FIG. 4, the material to the right of the end 7 of baffle 6 flows down through chute 3 to the discharge opening 2 while material to the left of the end 7 of baffle 6 flows back into the container. In the dispensing position of FIG. 4, the material settles below dotted line 14.

The repeated inversion of the container between store, fill (FIG. 2) and dispense (FIG. 4) and back to store, fill (FIG. 2) keeps the material stirred and results in uniform filling of the measuring chamber until the contents of the container have been exhausted. The particular sequence of positions illustrated in FIGS. 2-4 is not exclusive. FIGS. 2-4 illustrate clockwise motion about an axis perpendicular to the plane of the paper. Counterclockwise motion about such axis may be used. Also, the axis may be in the plane of the paper or at any angle to the plane of the paper. Mere bodily movement between store (FIG. 2) and dispense (FIG. 4) positions achieves the desired result.

I claim:

1. A box for holding and dispensing soap and other flowable material having a discharge opening at the top of the box, a discharge chute leading from the bottom to the top of the box, and the box defining a material chamber;
    a first baffle extending at an acute angle from the chute toward the bottom of the box and defining an opening to the chute and a measuring chamber between the lower end of the first baffle and the bottom of the box;
    and a second baffle spaced from and generally parallel to and overlapping the first baffle, extending at an acute angle from the bottom of the box toward the chute and defining with said first baffle a passage from said material chamber to said measuring chamber when the box is upright and for returning excess material to said material chamber when the box is inverted to discharge material from said measuring chamber through said discharge opening.

2. The box of claim 1 in which the box is rectangular.

3. The box of claim 2 in which the measuring chamber is in a corner of the box.

4. A box for holding and dispensing soap and other flowable material having a discharge opening at the top of the box, a discharge chute leading from the bottom to the top of the box, and the box defining a material chamber;
    a first baffle extending from said chute, disposed at an acute angle to the bottom of the box and defining a measuring chamber between the lower end of the first baffle and the bottom of the box;
    and a second baffle spaced from and generally parallel to and overlapping the first baffle, extending at an acute angle from the bottom of the box toward the chute and defining with said first baffle a passage from said material chamber to said measuring chamber when the box is upright and for returning excess material to said material chamber when the box is inverted to discharge material from said measuring chamber through said opening.

5. The box of claim 4 in which the box is rectangular.

6. The box of claim 5 in which the measuring chamber is in a corner of the box.

* * * * *